//united States Patent Office 2,867,594
Patented Jan. 6, 1959

2,867,594

VINYL CHLORIDE RESIN STABILIZED WITH 2-ETHYL HEXYL ARYL PHOSPHITES

Floyd R. Hansen, Bedford, and Baruch Zaremsky, Cleveland, Ohio, assignors to Ferro Chemical Corporation, Bedford, Ohio, a corporation of Ohio No Drawing. Application March 21, 1957
Serial No. 647,466

6 Claims. (Cl. 260—23)

This invention relates to a stabilizer for chlorine containing resins and to plastic compositions stabilized therewith.

It is well known that chlorine containing vinyl resins, such as polyvinyl chloride, copolymers of vinyl chloride, etc., have poor resistance to the effects of heat and/or light. Exposure of unstabilized or poorly stabilized chlorine containing vinyl resins to heat and/or light brings about discoloration, brittleness and loss of strength. This degradation is equally pronounced during the various fabrication processes as injection molding, calendering, etc.; operations which require heating of the plastic compositions.

Although many stabilizing agents have been proposed few of them are effective over wide ranges of operating conditions. Some of the proposed stabilizing materials offer an initial protection and over a prolonged heating allow the resin to darken. Other materials offer prolonged protection but allow the resin to initially become discolored.

It is, therefore, an object of the present invention to provide stabilizing agents which when added to a chlorine containing vinyl resin offer both an initial protection and a prolonged protection against degradation of the resins.

A further object of the present invention is to provide stabilizing agents which are economical and easy to incorporate into the chlorine containing vinyl resins.

Other objects will appear as the description proceeds.

To the accomplishment of the foregoing and related ends, the invention then, comprises the features hereinafter fully described and particularly pointed out in the claims, the following description setting forth in detail certain illustrative embodiments of the invention, these being indicative, however, of but a few of the ways in which the principle of the invention may be employed.

Broadly stated the present invention comprises a composition of matter comprising a chlorine containing vinyl resin and a stabilizer said stabilizer comprising an aryl-alkyl phosphite ester of the formula

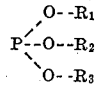

where $R_1$ is an aryl radical, $R_2$ is an alkyl radical and $R_3$ is one of the group of $R_1$ and $R_2$ radicals.

Thus, from the foregoing it will be seen that the stabilizers of the present invention comprise phosphite esters having one aryl group and two alkyl groups or two aryl groups and one alkyl group. The particular combination is not important, the only important factor being that there must be at least one aryl radical and at least one alkyl radical present. Further if there are two aryl groups they may be identical or different or if there are two alkyl groups they may be identical or different. The terms aryl and alkyl as used include aralkyl and alkaryl. If aralkyl and alkaryl radicals are used the phosphite ester would have to contain at least one aralkyl group, which functions as an alkyl radical, and at least one alkaryl group, which functions as an aryl radical. As for the alkyl groups they may be monohydric or polyhydric.

Tri-aryl or tri-alkyl phosphite esters have been used in combination with vinyl resins as for instance as disclosed in Patent 2,564,646. However, we have found that an aryl-alkyl phosphite ester, that is where both aryl and alkyl radicals are in a single compound, produces a synergistic effect far above that produced by either tri-aryl phosphites alone, tri-alkyl phosphites alone or where they are admixed together with the vinyl resin.

We have found that when a tri-alkyl phosphite is added to a vinyl resin and the composition exposed to heat, di-alkyl phosphites are formed, which over prolonged heating, are actually detrimental to the resin. When tri-aryl phosphites are used to stabilize vinyl resins they do not contribute good early color properties when the composition is subjected to heat. However, by using the aryl-alkyl phosphite of the present invention the resin is protected both as to good early color and maintains good color over a prolonged heating cycle.

So that the synergistic effect of the aryl-alkyl phosphite esters is more readily understood the following examples are given.

In the examples below the following basic vinyl composition is used:

100 parts polyvinyl chloride resin
80 parts dioctyl phthalate
2 parts stabilizer The aforegoing ingredients were thoroughly admixed and drawn down into sheets.

*Example 1*

Using the above vinyl formulation, 2 parts of triphenyl phosphite was used as the stabilizer. The sheet was heated at 340° F. and after 15 minutes turned dark yellow. After 45 minutes of heating at 340° F. the resin turned dark orange.

*Example 2*

Again using the aforegoing vinyl formulation, 2 parts of trioctyl phosphite was used as the stabilizing ingredient. Upon heating for 15 minutes at 340° F. the resin turned tan and after 45 minutes of heating the resin turned dark brownish red.

*Example 3*

Using the above vinyl formulation 2 parts of an admixture comprising 2 parts of triphenyl phosphite and 1 part of trioctyl phosphite was used as the stabilizer. After 15 minutes of heating at 340° F. the resin turned light yellow and after 45 minutes of heating the resin became dark orange.

*Example 4*

Repeating the foregoing experiment 2 parts of diphenyl mono-2-ethyl hexyl phosphite (a compound of the present invention) was used to stabilize the resin. After 15 minutes of heating at 340° F. the resin was only very light yellow and after 45 minutes the resin was a very light orange.

*Example 5*

Heating the above vinyl formulation at 340° F. with no stabilizer present the resin turned dark brown after 15 minutes.

From the foregoing illustrations the synergistic effect of the aryl-alkyl phosphite compound (of the present invention) is clearly established over an aryl phosphite alone or an alkyl phosphite alone or an admixture of the aryl and alkyl phosphites.

The aryl-alkyl phosphite compounds of the present invention produce equally outstanding results when used in conjunction with other stabilizing and/or hydrochloric acid acceptor materials. The following examples are used to illustrate the effectiveness of the present stabilizers in combination with a hydrochloric acid acceptor such as an organic epoxy compound.

In the examples given below the following basic vinyl composition is used:

100 parts polyvinyl chloride
45 parts dioctyl phthalate
5 parts epoxidized soya bean oil
2 parts stabilizer The aforegoing ingredients were thoroughly mixed on a two roll mill at 320° F. for about 5 minutes.

Example 6

Using the above vinyl formulation and procedure triphenyl phosphite was used as the stabilizer. The sheet was removed from the mill and heated in an oven at 365° F. After 15 minutes the sample turned orange and was deep red after 45 minutes.

Example 7

Repeating the foregoing experiment tri-2-ethyl hexyl phosphite ester was used as the stabilizer. The sample turned brown at 15 minutes and was black at 45 minutes.

Example 8

Using the above vinyl formulation, a two to one admixture of triphenyl phosphite and tri-2-ethyl hexyl phosphite was used as the stabilizer. When heated at 365° F. the sample turned yellow at 15 minutes and very dark red after 45 minutes.

Example 9

Repeating the aforegoing experiment, diphenyl mono-2-ethyl hexyl phosphite (a phosphite ester of the present invention) was used as the stabilizer. The sample when heated at 365° F. for 15 minutes was a very light yellow and only slightly darker yellow at 45 minutes.

Example 10

Using the above formulation and procedure di-2-ethyl hexyl mono-phenyl phosphite (another phosphite ester of the invention) was used as the stabilizer. The results were substantially identical with Example 4 above.

From the results of Examples 9 and 10 above the synergistic effect of the aryl-alkyl phosphite becomes quite evident. Using epoxidized soya bean oil with an aryl phosphite or an alkyl phosphite alone or in admixture produces vinyl resins which are highly discolored when heated at 365° F. for 15 minutes and are substantially destroyed after 45 minutes of heating. Using the aryl-alkyl phosphite of the present invention produces vinyl resins which only show slight discoloration after 45 minutes of heating at 365° F.

Attention is directed to the fact that when the present stabilizers are used in combination with an epoxy compound they are effective at temperatures up to 365° F. While epoxidized soya bean oil was used in the foregoing examples any of the other organic epoxy compounds having a boiling point not less than 212° F. could be used. Epichlorohydrin, epihydrin alcohol, dimethylglycidol, phenylmethylglycidol, styrene oxide and pinene oxide are examples of such organic epoxide compounds.

While all of the foregoing examples illustrate the superiority of the present stabilizers alone or in combination with organic epoxide compounds, this synergism is still present when other stabilizing materials such as the organic metal salts of cadmium, zinc or tin in combination with an organic alkali or alkali metal salt are additionally added to the vinyl formulation.

The following examples are given to illustrate vinyl compositions containing the present stabilizers and additionally containing an organic epoxy compound, an organic metal salt of cadmium, zinc, or tin and an organic metal alkali or alkali earth salt.

In all the examples given below the following basic vinyl composition is used:

100 parts polyvinyl chloride
45 parts dioctyl phthalate
5 parts epoxidized soya bean oil
1 part cadmium laurate
½ part barium laurate
1 part phosphite ester The aforegoing ingredients were thoroughly mixed on a two roll mill at 320° F. for about five minutes.

Example 11

Using the above formulation and procedure triphenyl phosphite was used as the phosphite ester. The sheet was removed from the mill and heated in an oven at 365° F. After 30 minutes the sample had a marked gray to yellow color. At 60 minutes the sheet had a very marked yellow color.

Example 12

Using the same formulation procedure as above, tri-2-ethyl hexyl phosphite was used as the phosphite ester. The sample when heated at 365° F. turned yellow at 60 minutes and a dark yellow at 75 minutes.

Example 13

Using the above formulation and procedure diphenyl mono-2-ethyl hexyl phosphite was used as the phosphite ester. Heating at 365° F. the sample only turned a slight yellow after 75 minutes and a marked yellow at 90 minutes with extremely less discoloration than the samples of Examples 1 and 2 through 105 minutes.

Example 14

Using the above formulation and procedure di-2-ethyl hexyl mono-phenyl phosphite was used as the phosphite ester. The results were substantially identical with Example 3 above.

From the results of Examples 3 and 4 the synergistic effect of the aryl-alkyl phosphites will be readily seen. When diphenyl mono-2-ethyl hexyl phosphite or di-2-ethyl hexyl mono-phenyl phosphite was used the resin sample did not change color until after 75 minutes. Using an aryl phosphite the resin turned color at 30 minutes and a very marked yellow at 60 minutes and when using an alkyl phosphite the resin turned yellow at 60 minutes and a dark yellow at 75 minutes.

The foregoing examples show the use of cadmium laurate and barium laurate as illustrative of the organic metal salts useful in combination with the present aryl-alkyl phosphites. However, any of the well known organic metal salts useful in vinyl resins may be used. The cadmium, zinc and tin salts of 2-ethyl hexoic acid, naphthenic acid, ricinoleic acid, tall oil and propionic acid and the calcium, barium, and strontium and the lithium, sodium and potassium salts of these acids are further examples of such organic metal salts.

Thus it will be seen that the aryl-alkyl phosphite stabilizers of the present invention produce a synergistic effect over aryl phosphite stabilizers, alkyl phosphite stabilizers or admixtures of aryl and alkyl stabilizers. Further the synergistic effect of the present stabilizers enhances the effectiveness of other stabilizing materials when present in a vinyl formulation.

The aryl-alkyl phosphites of the present invention useful as stabilizers for chlorine containing vinyl resins may be prepared by transesterfication of a tri-aryl phosphite or tri-alkaryl phosphite, such as, triphenyl phosphite or tricresyl phosphite with an alcohol having a boiling point higher than the aryl or alkaryl group. Or if desired the present stabilizers can be produced by transesterfication of a tri-alkyl phosphite or tri-aralkyl phosphite such as tri-octyl phosphite with phenol. In this latter instance it is also possible if desired to cause the transesterfication to proceed under pressure and thus use a phosphite ester of a lower boiling alcohol.

Other conventional materials, such as any usual plasticizer, coloring substances and inert materials may be incorporated into the vinyl resin composition in usual amounts along with the stabilizers of the present invention.

As to proportions, the stabilizers of the present invention are used in amounts of from 0.1 to 20 parts per 100 parts of chlorine containing vinyl resin. When other stabilizing materials, such as, the aforegoing organic epoxide compounds and the various organic metal salts are used in conjunction with the aryl-alkyl phosphites the total of these other stabilizers should be present in amounts of from .001 to 3.0 parts per 100 parts of resin.

Other modes of applying the principle of the invention may be employed, change being made as regards the details described, provided the features stated in any of the following claims or the equivalent of such be employed.

We, therefore, particularly point out and distinctly claim as our invention:

1. Polyvinyl chloride resin stabilized with 0.1 to 20 parts, per 100 parts of resin, of diphenyl mono-2-ethyl hexyl phosphite.

2. Polyvinyl chloride resin stabilized with 0.1 to 20 parts per 100 parts of resin, of di-2-ethyl hexyl mono-phenyl phosphite.

3. A composition of matter comprising a vinyl chloride resin and a stabilizer, said stabilizer comprising from 0.1 to 20 parts per 100 parts of resin of diphenyl mono-2-ethyl hexyl phosphite and from 0.001 to 3 parts per 100 parts of resin of epoxidized soya bean oil.

4. A composition of matter comprising a vinyl chloride resin and a stabilizer, said stabilizer comprising from 0.1 to 20 parts per 100 parts of resin of di-2-ethyl hexyl mono-phenyl phosphite and from 0.001 to 3 parts per 100 parts of resin of epoxidized soya bean oil.

5. A composition of matter comprising a vinyl chloride resin and a stabilizer, said stabilizer comprising from 0.1 to 20 parts per 100 parts of resin of diphenyl mono-2-ethyl hexyl phosphite and a total of from 0.001 to 3.0 parts per 100 parts of resin of epoxidized soya bean oil, cadmium laurate and barium laurate.

6. A composition of matter comprising a vinyl chloride resin and a stabilizer, said stabilizer comprising 0.1 to 20 parts per 100 parts of resin of a di-2-ethyl hexyl mono-phenyl phosphite and a total of from 0.001 to 3 parts per 100 parts of resin of epoxidized soya bean oil, cadmium laurate and barium laurate.

References Cited in the file of this patent

UNITED STATES PATENTS

| | | |
|---|---|---|
| 2,456,216 | Richter | Dec. 14, 1948 |
| 2,471,463 | Fon Toy | May 31, 1949 |
| 2,564,646 | Leistner et al. | Aug. 14, 1951 |
| 2,572,571 | Marling | Oct. 23, 1951 |
| 2,596,141 | Gamrath et al. | May 13, 1952 |
| 2,668,800 | Johnston | Feb. 9, 1954 |
| 2,669,549 | Darby | Feb. 16, 1954 |
| 2,671,064 | Cowell et al. | Mar. 2, 1954 |
| 2,716,092 | Leistner et al. | Aug. 23, 1955 |
| 2,752,319 | Lipke et al. | June 26, 1956 |
| 2,784,171 | Chadwick | Mar. 5, 1957 |

OTHER REFERENCES

Schildknecht: Polymer Processes, pages 564–5, Interscience (May 1956).